US011664737B2

(12) United States Patent
Maki et al.

(10) Patent No.: US 11,664,737 B2
(45) Date of Patent: May 30, 2023

(54) DC TRANSFORMATION SYSTEM

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Koji Maki, Kawasaki (JP); Masayuki Nogi, Hachioji (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 333 days.

(21) Appl. No.: 17/092,813

(22) Filed: Nov. 9, 2020

(65) Prior Publication Data

US 2021/0058004 A1   Feb. 25, 2021

Related U.S. Application Data

(63) Continuation of application No. PCT/JP2019/017041, filed on Apr. 22, 2019.

(30) Foreign Application Priority Data

May 10, 2018   (JP) .............................. JP2018-091568

(51) Int. Cl.
*H02M 7/06*      (2006.01)
*H02M 3/335*     (2006.01)
(Continued)

(52) U.S. Cl.
CPC ............. *H02M 7/06* (2013.01); *H02J 7/0068* (2013.01); *H02M 1/007* (2021.05);
(Continued)

(58) Field of Classification Search
CPC ...... H02M 7/06; H02M 1/007; H02M 1/0074; H02M 1/0093; H02M 3/1584;
(Continued)

(56) References Cited

U.S. PATENT DOCUMENTS 6,297,973 B1 * 10/2001 Jian-Ping ............... H02M 7/523
363/40
10,611,245 B2 * 4/2020 Fukushima ............... H02J 9/00
(Continued)

FOREIGN PATENT DOCUMENTS

EP   0 377 510 A2   7/1990
EP   0 377 510 A3   7/1990
(Continued)

OTHER PUBLICATIONS

International Search Report dated Jun. 25, 2019 in PCT/JP2019/017041 filed Apr. 22, 2019, citing documents AN-AR therein, 2 pages.
(Continued)

*Primary Examiner* — Yusef A Ahmed
(74) *Attorney, Agent, or Firm* — Maier & Maier, PLLC

(57) ABSTRACT

According to the present embodiment, a DC transformation system includes a rectifier, a first power conversion device, a second power conversion device, and a control device. The rectifier rectifies AC power supplied from an AC power source and outputs a first DC voltage. The first power conversion device is connected in series to the rectifier and outputs a second DC voltage. The second power conversion device is connected in parallel to the rectifier and converts power supplied from the rectifier to supply the converted power to the first power conversion device. The control device controls the first power conversion device to cause an addition/subtraction voltage of the first DC voltage and the second DC voltage to be a predetermined voltage.

6 Claims, 17 Drawing Sheets

(51) Int. Cl.
*H02J 7/00* (2006.01)
*H02M 1/00* (2006.01)
*H02M 3/158* (2006.01)
*H02M 7/219* (2006.01)
*H02M 7/217* (2006.01)

(52) U.S. Cl.
CPC ........ *H02M 1/0074* (2021.05); *H02M 1/0093* (2021.05); *H02M 3/1584* (2013.01); *H02M 3/1586* (2021.05); *H02M 3/33523* (2013.01); *H02M 3/33573* (2021.05); *H02M 3/33576* (2013.01); *H02M 3/33584* (2013.01); *H02M 7/219* (2013.01); *H02M 7/2176* (2013.01)

(58) Field of Classification Search
CPC ........... H02M 3/1586; H02M 3/33523; H02M 3/33573; H02M 3/33576; H02M 3/33584; H02M 7/2176; H02M 7/219; H02M 1/32; H02M 1/36; H02M 1/4275; H02M 3/01; H02M 3/33553; H02J 7/0068; Y02B 70/10
See application file for complete search history.

(56) References Cited

U.S. PATENT DOCUMENTS

| | | | | |
|---|---|---|---|---|
| 10,965,141 B2* | 3/2021 | Yang | ................... | H02M 1/4225 |
| 2008/0198632 A1* | 8/2008 | Takayanagi | ........... | H02M 7/797 363/17 |
| 2008/0278129 A1 | 11/2008 | Shimizu | | |
| 2011/0134672 A1* | 6/2011 | Sato | ......................... | H02M 1/10 363/126 |
| 2015/0280455 A1* | 10/2015 | Bosshard | .............. | B60L 53/122 307/104 |
| 2015/0280601 A1* | 10/2015 | Sakakibara | ............. | H02M 1/15 363/37 |
| 2016/0276964 A1* | 9/2016 | Zushi | ........................ | H02P 6/14 |
| 2016/0329716 A1* | 11/2016 | Inoue | ....................... | H02J 3/46 |
| 2016/0329811 A1* | 11/2016 | Du | .......................... | H02M 1/14 |
| 2017/0133921 A1* | 5/2017 | Okumura | ................ | H02M 7/49 |
| 2017/0170744 A1* | 6/2017 | Kouno | .................... | B60L 53/22 |
| 2017/0237354 A1* | 8/2017 | Takahara | .......... | H02M 3/33546 363/17 |
| 2017/0324347 A1* | 11/2017 | Xu | ..................... | H02M 3/33584 |
| 2017/0324348 A1* | 11/2017 | Yamashita | ........... | H02M 5/458 |
| 2017/0361711 A1* | 12/2017 | Fukushima | ............. | B60L 50/53 |
| 2017/0361713 A1* | 12/2017 | Fukushima | ............... | H02J 4/00 |
| 2017/0361716 A1* | 12/2017 | Sato | ...................... | H02M 7/219 |
| 2018/0183335 A1* | 6/2018 | Fan | ......................... | H02M 3/01 |
| 2018/0323700 A1* | 11/2018 | Mizutani | .......... | H02M 3/33576 |
| 2018/0334046 A1* | 11/2018 | Lee | ....................... | B60L 15/007 |
| 2019/0020281 A1* | 1/2019 | Yang | .................. | H02M 7/5387 |
| 2019/0199100 A1* | 6/2019 | Kadota | ................. | H02J 7/0013 |
| 2019/0267907 A1* | 8/2019 | Jitaru | ............... | H02M 3/33576 |
| 2020/0235656 A1* | 7/2020 | Forouzesh | ............. | H02M 7/06 |
| 2021/0044212 A1* | 2/2021 | Furukawa | ............. | H02M 5/45 |
| 2021/0155100 A1* | 5/2021 | Khaligh | ............ | H02M 1/4208 |
| 2021/0218339 A1* | 7/2021 | Tsuchiya | ................. | H02M 1/10 |
| 2021/0399628 A1* | 12/2021 | Yeo | ........................ | H02M 1/36 |
| 2022/0321016 A1* | 10/2022 | Khaligh | ............ | H02M 3/33561 |

FOREIGN PATENT DOCUMENTS

| | | |
|---|---|---|
| EP | 3 553 934 A1 | 10/2019 |
| JP | 55-136870 A | 10/1980 |
| JP | 6-284730 A | 10/1994 |
| JP | 2004-15852 A | 1/2004 |
| JP | 2006-211854 A | 8/2006 |
| JP | 2010-183663 A | 8/2010 |
| JP | 2012-165492 A | 8/2012 |
| JP | 2014-131372 A | 7/2014 |
| JP | 2017-140908 A | 8/2017 |
| JP | 2018-98834 A | 6/2018 |
| WO | WO 2014/103745 A1 | 7/2014 |

OTHER PUBLICATIONS

Kataoka, A. et al., "Hybrid Inverter and Converter for Electric Railways," Special Reports, vol. 61, No. 9, 2006, (with English Translation), 9 pages.

* cited by examiner

DC TRANSFORMATION SYSTEM

CROSS-REFERENCE TO RELATED APPLICATIONS

This application is a continuation application of International Application No. PCT/JP2019/017041, filed Apr. 22, 2019, which claims priority to Japanese Patent Application No. 2018-091568 filed May 10, 2018. The contents of these applications are incorporated herein by reference in their entirety.

FIELD

Embodiments of the present invention relate to a DC transformation system.

BACKGROUND

A typical DC transformation system is an AC/DC converter using a diode rectifier 12 (FIGS. 15 and 16). A power conversion device 14 is connected in parallel to the diode rectifier 12 so as to compensate the output capacity of the diode rectifier 12. It is known that there are a case in which power is supplied to the power conversion device 14 by a storage battery 13 (FIG. 15) and a case in which power is supplied by an AC power source 10 (FIG. 16). A DC transformation system in which the power conversion device 14 and a smoothing capacitor 15 are connected in parallel to convert the output from the AC power source 10 into a direct current is also known (FIG. 17).

However, a diode rectifier has no function to adjust a DC voltage and the DC voltage adversely reduces with increase of load due to impedance of the reactor while the diode rectifier is inexpensive. Further, when the power conversion device 14 is connected in parallel to output terminals, a capacity of the power conversion device 14 that can always respond to the voltage between the connected terminals is required and the DC transformation system is likely to increase in the size.

Therefore, an object to be solved by the present invention is to provide a DC transformation system that has a function to adjust a DC voltage and that can be downscaled more.

DETAILED DESCRIPTION

Figure 1:
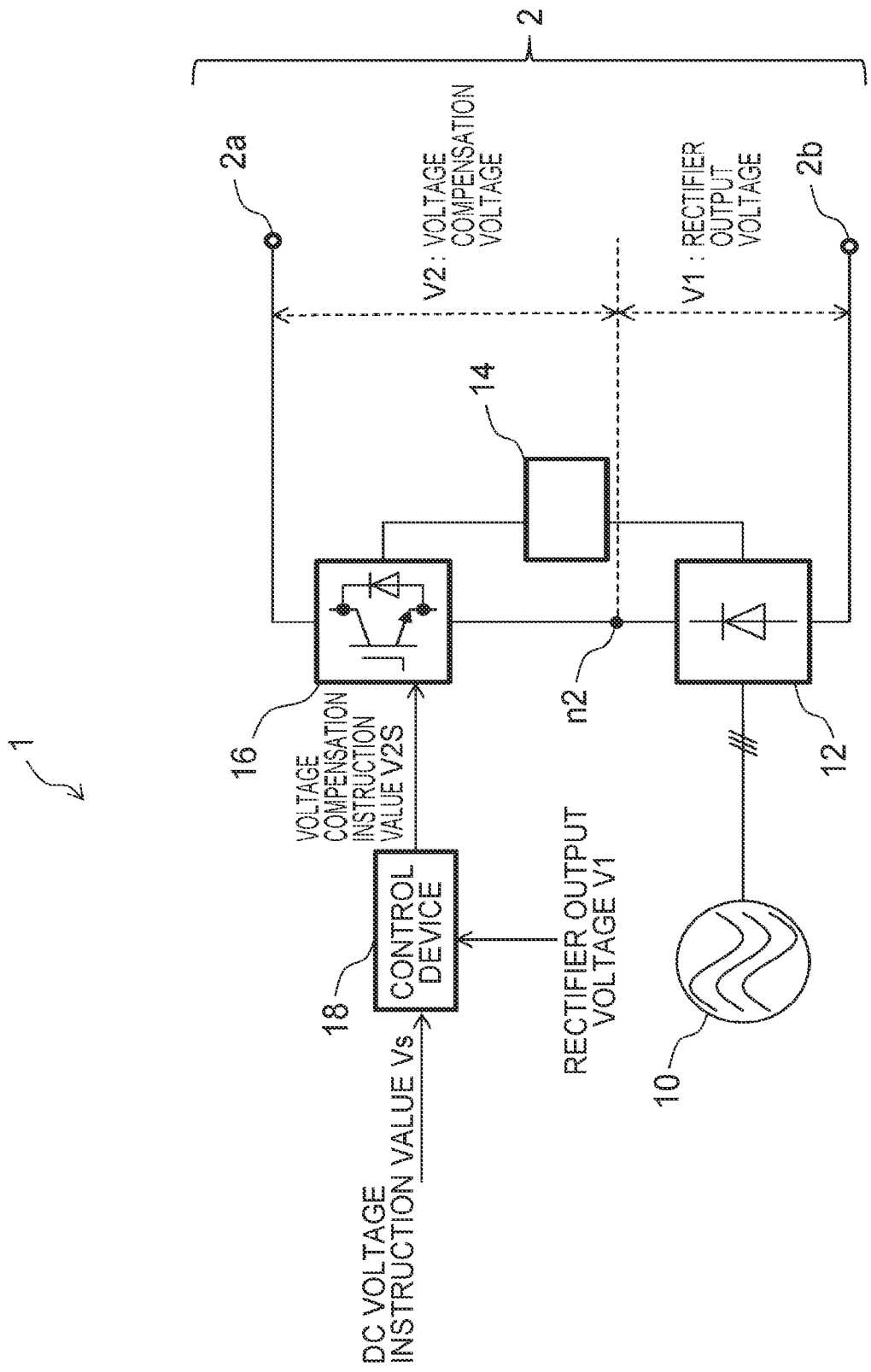
FIG. 1 is a diagram illustrating a configuration example of a DC transformation system according to a first embodiment.

According to the present embodiment, a DC transformation system includes a rectifier, a first power conversion device, a second power conversion device, and a control device. The rectifier rectifies AC power supplied from an AC power source and outputs a first DC voltage. The first power conversion device is connected in series to the rectifier and outputs a second DC voltage. The second power conversion device is connected in parallel to the rectifier and converts power supplied from the rectifier to supply the converted power to the first power conversion device. The control device controls the first power conversion device to cause an addition/subtraction voltage of the first DC voltage and the second DC voltage to be a predetermined voltage.

A DC transformation system according to embodiments of the present invention will now be explained in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

FIG. 1 is a diagram illustrating a configuration example of a DC transformation system 1 according to the present embodiment. As illustrated in FIG. 1, the DC transformation system 1 according to the present embodiment is a system capable of feeding DC power and is configured to include a rectifier 12, a power conversion device 14, a series compensation device 16, and a control device 18. FIG. 1 further illustrates a positive terminal 2a and a negative terminal 2b. For example, the positive terminal 2a and the negative terminal 2b constitute a DC electric line 2.

The rectifier 12 is, for example, a diode rectifier and is connected to an AC power source 10 to rectify an alternate current into a direct current. The rectifier 12 outputs a rectifier output voltage V1.

The power conversion device 14 supplies power to the series compensation device 16 using a DC output obtained from the rectifier 12. For example, the power conversion device 14 is connected in parallel to the rectifier 12 and converts power supplied from the rectifier 12 to supply the converted power to the series compensation device 16. While receiving supply of power from the rectifier 12, the power conversion device 14 according to the present embodiment is not limited thereto and may receive supply of power from a different power source, for example, an AC power source. The power conversion device 14 according to the present embodiment corresponds to a second power conversion device.

The series compensation device 16 is, for example, a DC/DC converter and is connected between a node n2 on the positive side of the diode rectifier 12 and the positive terminal 2a. The series compensation device 16 outputs a voltage compensation voltage V2 using the power supplied from the power conversion device 14. The series compensation device 16 according to the present embodiment corresponds to a first power conversion device.

The control device 18 is, for example, a substrate configured to include a CPU (Central Processing Unit) and outputs a voltage compensation instruction value V2S to the series compensation device 16 on the basis of a voltage instruction value Vs and the rectifier output voltage V1. That is, the control device 18 controls the series compensation device 16 to cause an addition voltage obtained by adding the rectifier output voltage V1 and the voltage compensation voltage V2 to be a predetermined voltage Vs. The control device 18 also controls the series compensation device 16 to cause the voltage compensation voltage V2 to be equal to or lower than the rectifier output voltage V1. Accordingly, the power converted by the series compensation device 16 becomes equal to or lower than the power converted by the rectifier 12.

Figure 2:
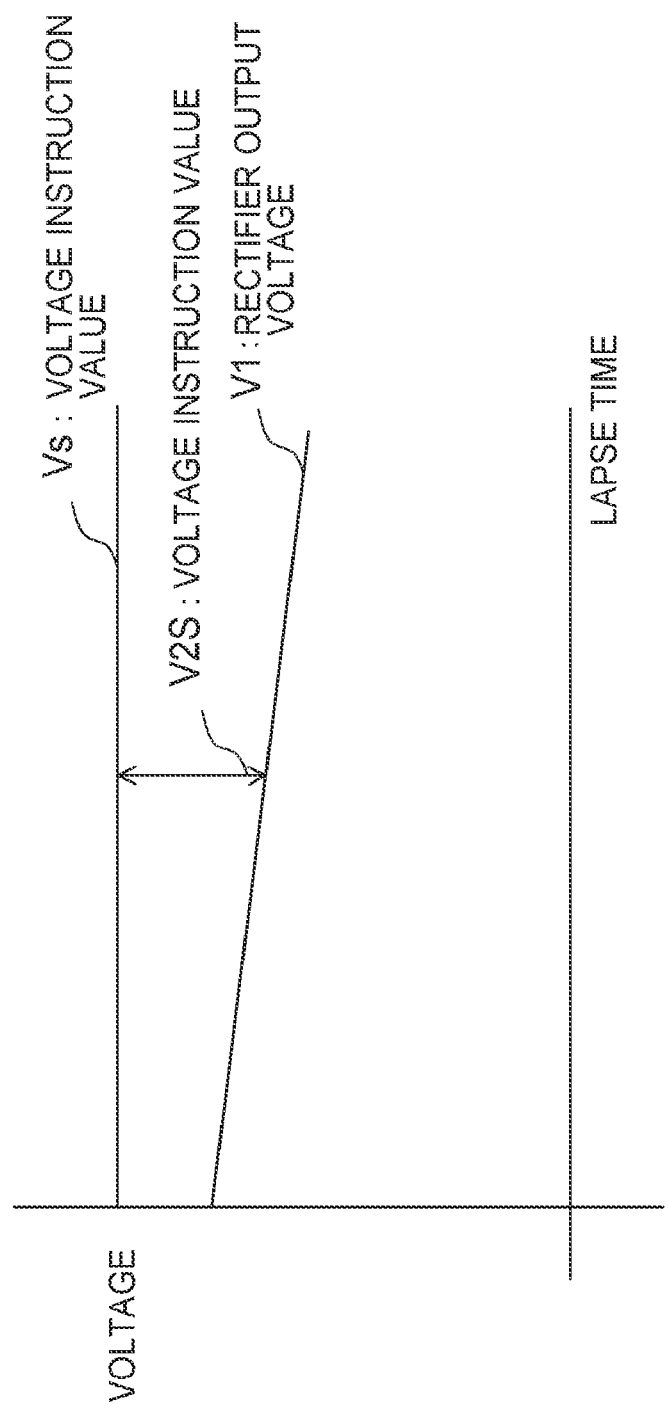
FIG. 2 is a diagram schematically illustrating a relation among a voltage instruction value, a rectifier output voltage, and a voltage compensation instruction value.

FIG. 2 is a diagram schematically illustrating a relation among the voltage instruction value Vs, the rectifier output voltage V1, and the voltage compensation instruction value V2s. The vertical axis represents the voltage and the horizontal axis represents the lapse time. As illustrated in FIG. 2, the control device 18 controls the series compensation device 16 to cause the addition voltage of the rectifier output voltage V1 and the voltage compensation voltage V2 to be the voltage instruction value Vs. This enables the potential between the positive terminal 2a and the negative terminal 2b to be more stable. In a case in which a diode rectifier is used as the rectifier 12, no high-frequency current flows and an inexpensive general-purpose rectifier diode compliant with a 50 Hz/60 Hz power source can be used. Because the series compensation device 16 outputs only a stepped-up voltage portion, the capacity of a semiconductor switching element and the like can be decreased more.

Figure 3:
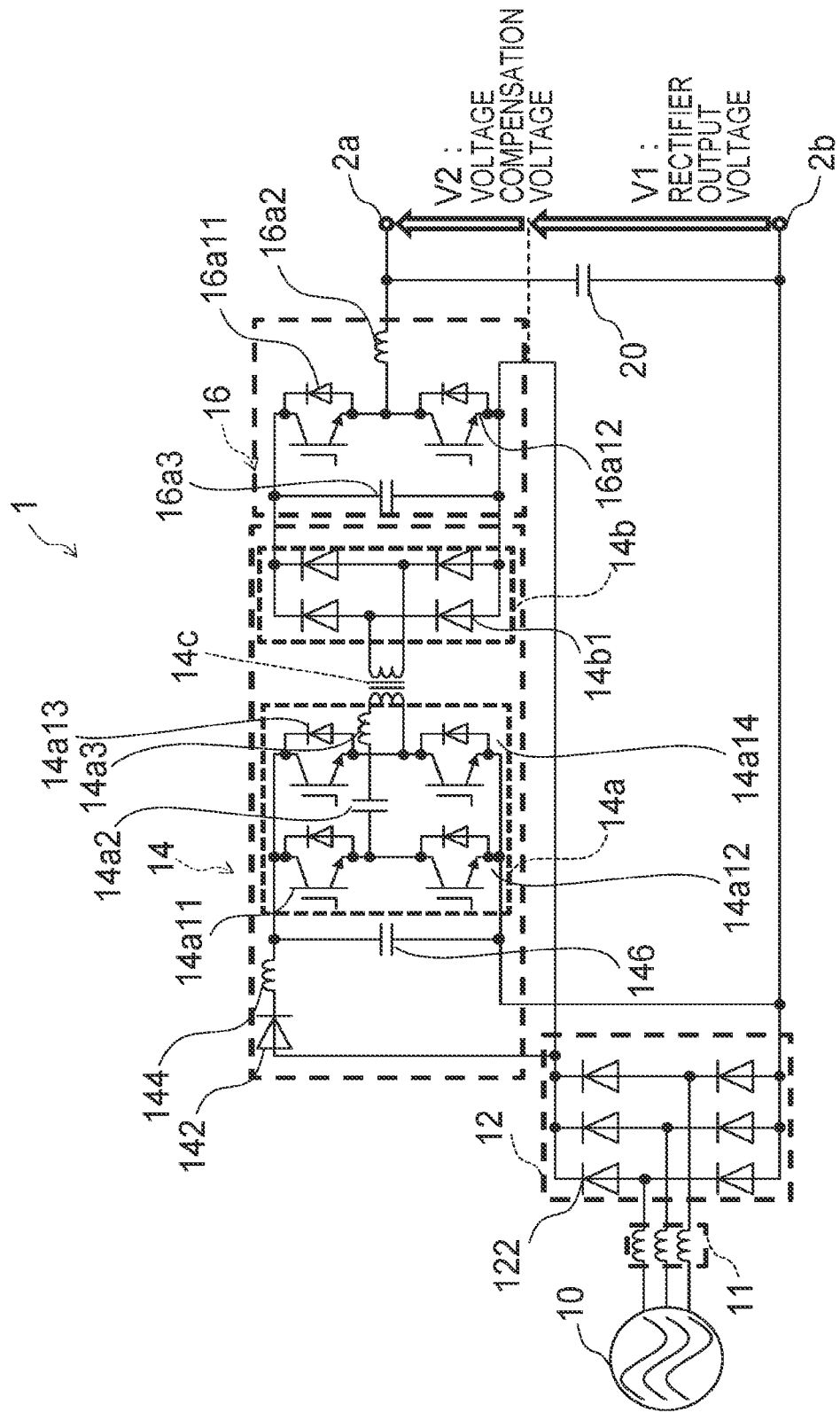
FIG. 3 is a diagram illustrating a detailed configuration example of the DC transformation system according to the present embodiment.

FIG. 3 is a diagram illustrating a detailed configuration example of the DC transformation system 1 according to the present embodiment. FIG. 3 illustrates an AC reactor 11, the rectifier 12, the power conversion device 14, the series compensation device 16, and a capacitor 20.

The AC reactor 11 indicates an interconnected reactor, a system inductance, and a leakage inductance of a transformer or an electric generator. The rectifier 12 is constituted by bridge connection of a plurality of power diodes 122.

The power conversion device 14 is a full-bridge resonant converter and includes a diode 142, a reactor 144, a capacitor 146, a DC/AC converter 14a, an AC/DC converter 14b, and an isolation transformer 14c. The diode 142 is provided to supply power in one direction. The reactor 144 and the capacitor 146 constitute an LC filter and reduce, for example, noise components synchronous with a switching frequency.

The DC/AC converter 14a is a DC/AC converter having a full-bridge circuit. The DC/AC converter 14a includes four switching elements $14a11$ to $14a14$, a resonant capacitor $14a2$, and a resonant reactor $14a3$. Each of the switching elements $14a11$ to $14a14$ is formed of a semiconductor switching element and an antiparallel diode. The four switching elements $14a11$ to $14a14$ form the full-bridge circuit. The resonant capacitor $14a2$ and the resonant reactor $14a3$ are inserted between both ends of the primary side of the isolation transformer 14c and an output of the full-bridge circuit formed of the four switching elements $14a11$ to $14a14$. The leakage inductance of the isolation transformer or the like may be used as the resonant reactor.

More specifically, the power conversion device 14 includes the first and second switching elements $14a11$ and $14a12$ connected in series between DC terminals on the input side, and the third and fourth switching elements $14a13$ and $14a14$ connected in parallel to the first and second switching elements $14a11$ and $14a12$. The power conversion device 14 also includes a primary coil, the resonant reactor $14a3$, and the resonant capacitor $14a2$ connected between a neutral point of the third and fourth switching elements $14a13$ and $14a14$ and a neutral point of the first and second switching elements $14a11$ and $14a12$. The power conversion device 14 includes a secondary coil constituting the isolation transformer 14c along with the primary coil, and the AC/DC converter 14b connected to the secondary coil and having the series compensation device 16 connected between DC terminals on the output side.

When the switching element $14a11$ of an upper arm on the left side of the full-bridge circuit and the switching element $14a14$ of a lower arm on the right side are turned ON and the switching element $14a12$ of a lower arm on the left side and the switching element $14a13$ of an upper arm on the right side are turned OFF, a positive voltage is applied to the both ends on the primary side of the isolation transformer 14c. On the other hand, when the switching element $14a12$ of the lower arm on the left side of the full-bridge circuit and the switching element $14a13$ of the upper arm on the right side are turned ON and the switching element $14a11$ of the upper arm of the left side and the switching element $14a14$ of the lower arm on the right side are turned OFF, a negative voltage is applied to the both ends on the primary side of the isolation transformer 14c.

Due to the ON/OFF operation of these four switching elements $14a11$ to $14a14$, an AC current changing between positive and negative flows in a series resonant circuit including the resonant capacitor $14a2$ and the resonant reactor $14a3$ and zero voltage switching is realized by the AC current at a turn-on time with a combination of two switching elements $14a1$. In this way, soft switching of the switching elements $14a11$ to $14a14$ used in the full-bridge circuit is realized by an AC current changing between positive and negative. That is, each of the first to fourth switching elements $14a11$ to $14a14$ is formed of the semiconductor switching element and the antiparallel diode and soft switching is performed due to resonance of the resonant reactor 14a3 and the resonant capacitor 14a2.

The AC/DC converter 14b has four diodes 14b1. These four diodes 14b1 constitute a full-bridge rectifier circuit. A high-frequency AC voltage from the secondary side of the isolation transformer 14c is converted into a DC voltage by the full-bridge rectifier circuit formed of the four diodes. The AC/DC converter 14b according to the present embodiment corresponds to an AC/DC converter. The power conversion device 14 is not limited to a resonance power conversion circuit and may be a flyback circuit, a forward converter, a push-pull converter, or the like.

The series compensation device 16 is constituted of a typical step-down chopper and an output end thereof is connected to the terminal 2a on a high-tension side of the DC transformation system 1 and a terminal on a high-tension side of the rectifier 12 via a reactor 16a2. The series compensation device 16 includes two switching elements 16a11 and 16a12, the reactor 16a2, and a capacitor 16a3. The switching elements 16a11 and 16a12 are components identical to the switching element 14a11 and are each formed of a semiconductor switching element and an antiparallel diode. The semiconductor switching element is, for example, an IGBT or a MOSFET using silicon (Si) or silicon carbide (SiC).

More specifically, the series compensation device 16 includes the first and second switching elements 16a11 and 16a12 connected in series between output terminals of the power conversion device 14. The series compensation device 16 also includes the reactor 16a2 connected between a neutral point of the first and second switching elements 16a11 and 16a12 and the output terminal 2a on the high-tension side, and the capacitor 16a3 connected in parallel to the first and second switching elements 16a11 and 16a12 connected in series.

An output terminal of the AC/DC converter 14b is connected to upper and lower arms of the switching elements 16a11 and 16a12. A voltage between a connection point of the upper and lower arms of the switching elements 16a11 and 16a12 and the lower arm corresponds to the voltage compensation voltage V2. In response to a firing signal from the control device 18 (FIG. 1), firing timings of the switching elements 16a11 and 16a12 are controlled, whereby the voltage compensation voltage V2 is adjusted. In this way, the first and second switching elements 16a11 and 16a12 of the series compensation device 16 are PWM-controlled by the control device 18. The smoothing capacitor 20 is not always required and may be omitted in a transformation system (a feeding system) of an electric railroad when a ripple voltage output from the series compensation device 16 is allowable.

As described above, according to the present embodiment, the voltage compensation voltage V2 of the series compensation device 16 can be superimposed on the diode rectifier 12. Accordingly, the output voltage of the DC transformation system 1 can be adjusted with control of the output voltage of the series compensation device 16. In this way, because the series compensation device 16 outputs only a portion of the DC voltage V2 corresponding to a stepped-up voltage, the capacities of the power conversion device 14 and the series compensation device 16 can be reduced more.

First Modification of First Embodiment

The DC transformation system 1 according to a first modification of the first embodiment is different from the DC transformation system 1 according to the first embodiment in that a short-circuit free-wheeling diode 22 is provided. In the following descriptions, differences between the first embodiment and the first modification are explained.

Figure 4:
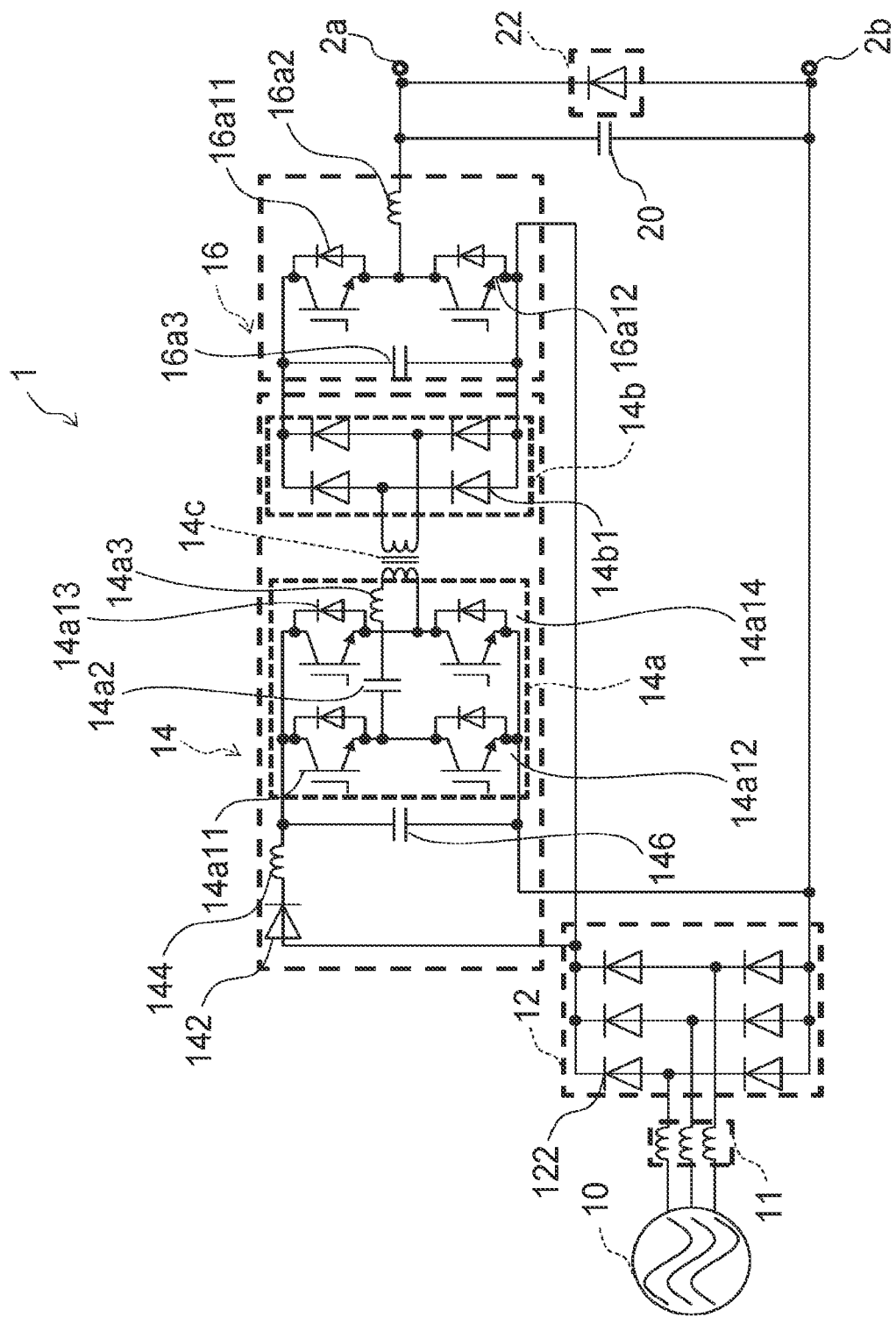
FIG. 4 is a diagram illustrating a configuration example of a DC transformation system according to a first modification of the first embodiment.

FIG. 4 is a diagram illustrating a configuration example of the DC transformation system 1 according to the first modification of the first embodiment. As illustrated in FIG. 4, the short-circuit free-wheeling diode 22 is connected in antiparallel between the DC output terminals 2a and 2b of the DC transformation system 1. Accordingly, when the output of the DC transformation system 1 short-circuits, a short-circuit free-wheeling current caused by a connected inductive load can be prevented from flowing in the series compensation device 16. Because the short-circuit free-wheeling diode 22 is connected in antiparallel to the DC output of the DC transformation system 1, the short-circuit free-wheeling current can also be prevented from flowing in the diode rectifier 12.

Second Modification of First Embodiment

The DC transformation system 1 according to the second modification of the first embodiment is different from the DC transformation system 1 according to the first embodiment in that the short-circuit free-wheeling diode 22 is connected in antiparallel to the series compensation device 16. In the following descriptions, differences between the first embodiment and the second modification are explained.

Figure 5:
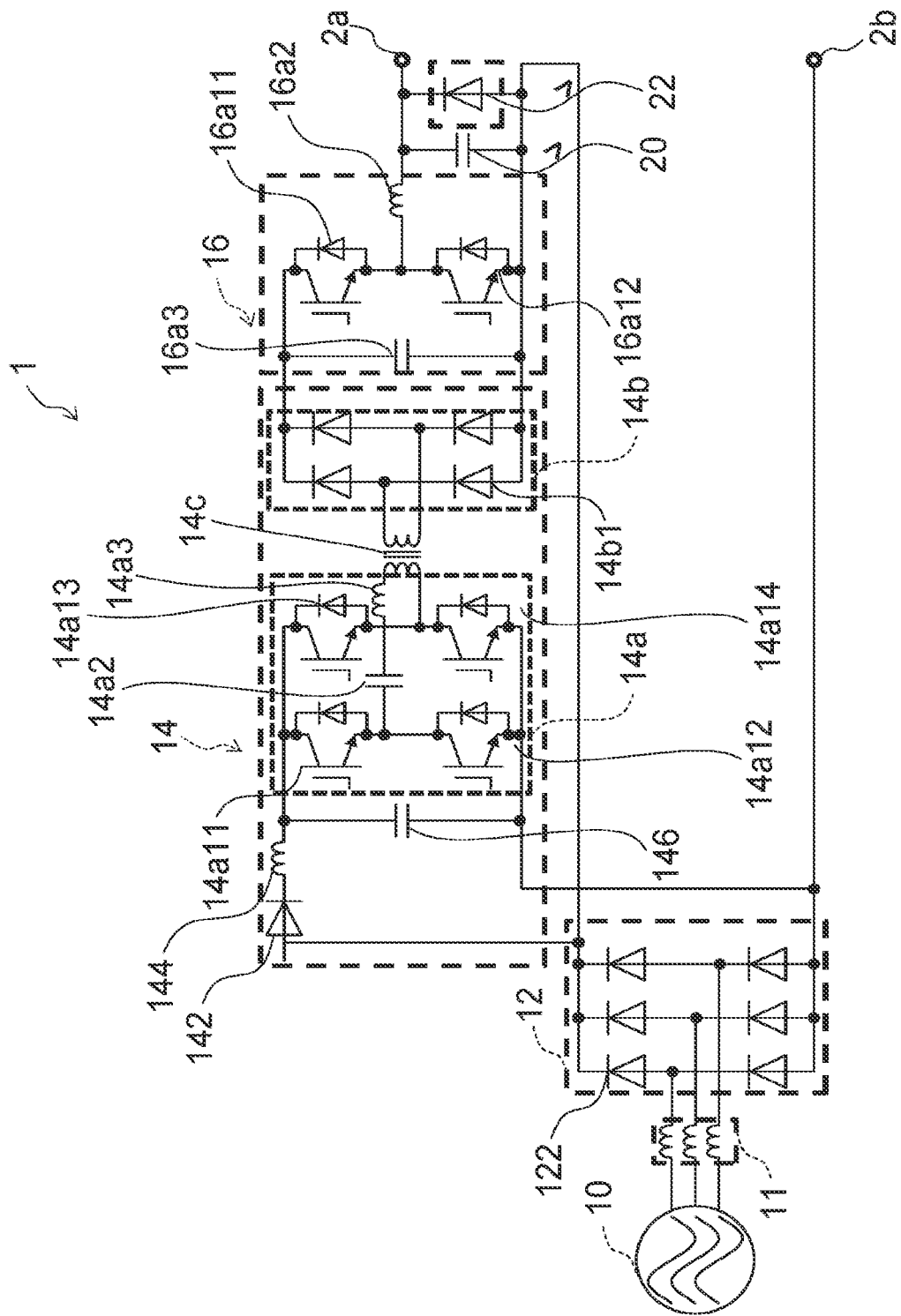
FIG. 5 is a diagram illustrating a configuration example of a DC transformation system according to a second modification of the first embodiment.

FIG. 5 is a diagram illustrating a configuration example of the DC transformation system 1 according to the second modification of the first embodiment. As illustrated in FIG. 5, the short-circuit free-wheeling diode 22 is connected in antiparallel to the series compensation device 16. Accordingly, when the output of the DC transformation system 1 short-circuits, the short-circuit free-wheeling current caused by a connected inductive load can be prevented from flowing in the series compensation device 16. In this case, the short-circuit free-wheeling current flows in the diode rectifier 12, which is the point in which the DC transformation system 1 is different from the DC transformation system 1 according to the second modification of the first embodiment. The smoothing capacitor 20 may be connected in parallel to the series compensation device 16.

Figure 6:
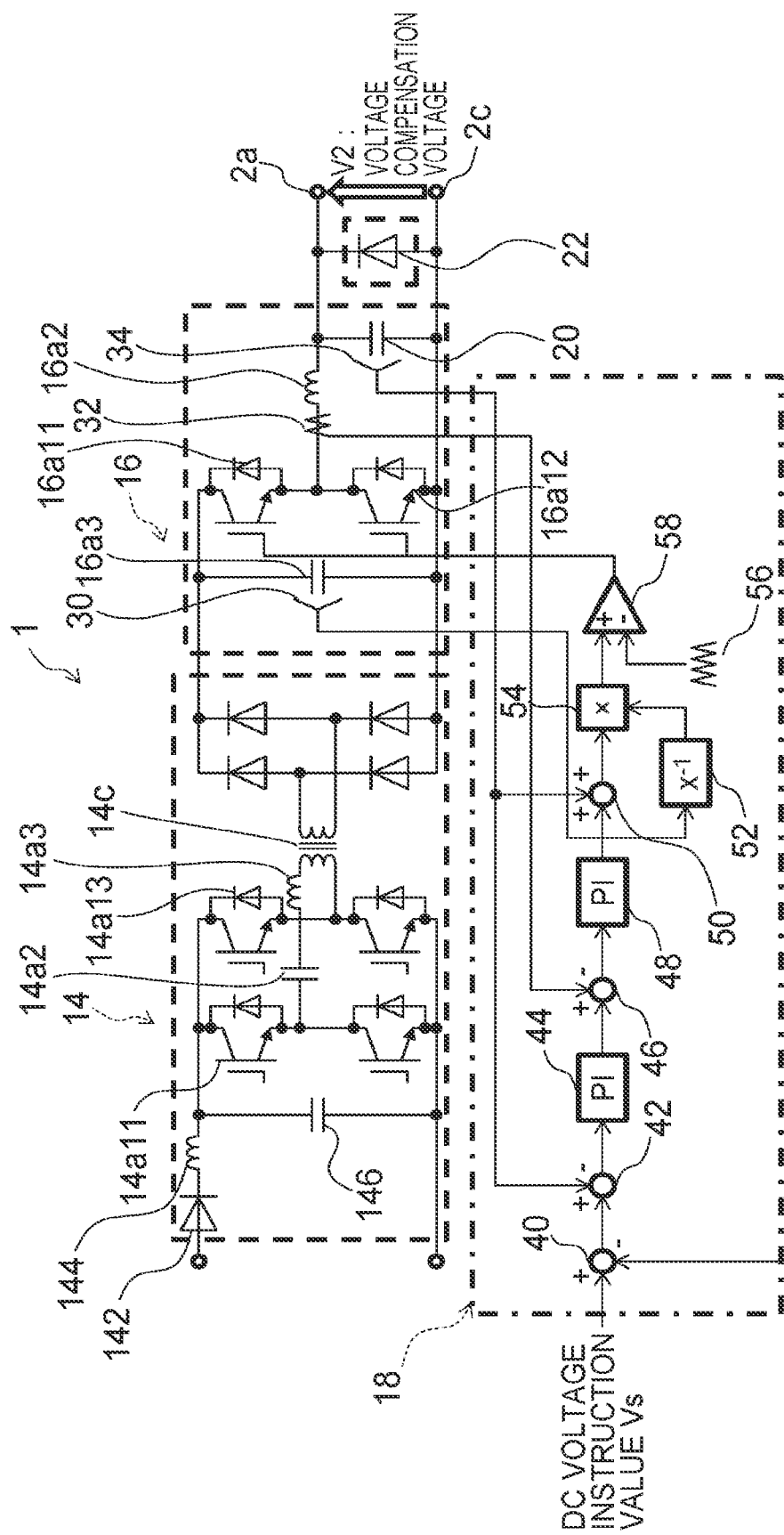
FIG. 6 is a block diagram illustrating an example of a configuration of a controller according to the second modification of the first embodiment.

FIG. 6 is a block diagram illustrating an example of a configuration of the control device 18 according to the second modification of the first embodiment. As illustrated in FIG. 6, the control device 18 is configured to include computers 40, 42, 46, and 50, PI controllers 44 and 48, a divider 52, a multiplier 54, a carrier wave generator 56, and a comparator 58.

FIG. 6 also illustrates voltage sensors 30 and 34, and a current sensor 32. The voltage sensor 30 outputs an input voltage V30 of the series compensation device 16 to the reciprocal calculator 52. The current sensor 32 outputs a reactor current I32 of the series compensation device 16 to the computer 46. The voltage sensor 34 outputs the output voltage V2 of the series compensation device 16 to the computers 42 and 50.

The computer 40 computes a difference value between the DC voltage instruction value Vs and the output voltage V1 of the rectifier 12 and outputs the voltage compensation instruction value V2S. The computer 42 computes a difference value between the voltage compensation instruction value V2S and the output voltage V2 of the series compensation device 16 and outputs a computing result.

The PI controller 44 executes PI control using the difference value between the voltage compensation instruction value V2S and the output voltage V2 of the series compensation device 16. The computer 46 computes a difference value between a PI control result of the PI controller 44 and the reactor current I32 of the series compensation device 16 and outputs a computing result.

The PI controller 48 executes PI control using the difference value between the PI control result and the reactor current I32 of the series compensation device 16. The computer 50 adds the PI control result of the PI controller 48 and the output voltage V2 of the series compensation device 16 and outputs an addition value.

The reciprocal calculator 52 obtains the reciprocal of the input voltage V30 of the series compensation device 16 and outputs the reciprocal to the multiplier 54. The multiplier 54 multiplies the addition value of the PI control result of the PI controller 48 and the output voltage V2 of the series compensation device 16 by the reciprocal of the input voltage V30.

The comparator 58 compares a carrier wave generated by the carrier wave generator 56 and the computing result of the multiplier 54 and generates a gate signal, that is, a PWM control signal for the switching elements 16a1. Practically, a dead time is added to provide a period in which the upper and lower arms are both turned OFF, to prevent upper-lower arm short-circuiting due to delay variation of the PWM control signal.

Figure 7:
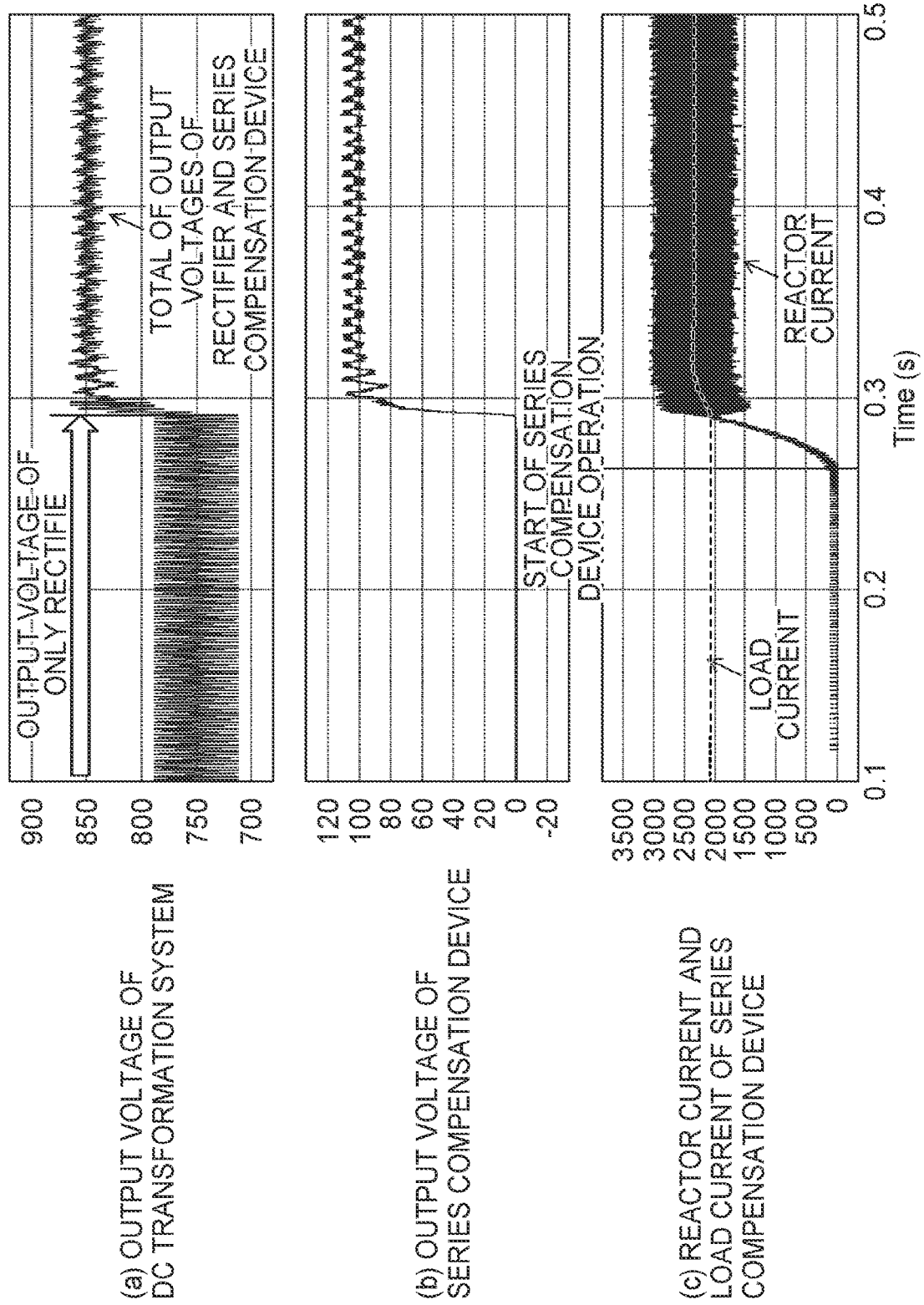
FIG. 7 is a diagram illustrating a result of a control simulation of the controller.

FIG. 7 is a diagram illustrating a result of a control simulation of the control device 18 illustrated in FIG. 6. In FIG. 7, (a) illustrates temporal changes of an output voltage of the DC transformation system 1, (b) illustrates temporal changes of an output voltage of the series compensation device 16, and (c) illustrates temporal changes of a reactor current and a load current of the series compensation device 16. The vertical axes of (a) and (b) in FIG. 7 represent the voltage and the vertical axis of (c) represents the current. The horizontal axes of (a), (b), and (c) in FIG. 7 represent the lapse time.

As illustrated in FIG. 7, the output voltage of only the rectifier 12 is obtained in a period in which the series compensation device 16 does not operate. Meanwhile, at a timing when the series compensation device 16 starts operating, the reactor current of the series compensation device 16 increases and the output voltage of the series compensation device 16 increases when the reactor current becomes equal to the load current.

With increase in the output voltage of the series compensation device 16, the output voltage of the DC transformation system 1 also increases and the operation transitions to a stationary operation when the output voltage becomes a control target value. In this way, the voltage adjustment function of the DC transformation system 1 can be realized by the control operation on the series compensation device 16 by the control device 18 illustrated in FIG. 6.

Third Modification of First Embodiment

The DC transformation system 1 according to a third modification of the first embodiment is different from the DC transformation system 1 according to the first embodiment in that the short-circuit free-wheeling diode 22 is connected in parallel to the terminals 2a-2b and in that the series compensation device 16 is formed of an interleaved power conversion device. In the following descriptions, differences between the first embodiment and the third modification are explained.

Figure 8:
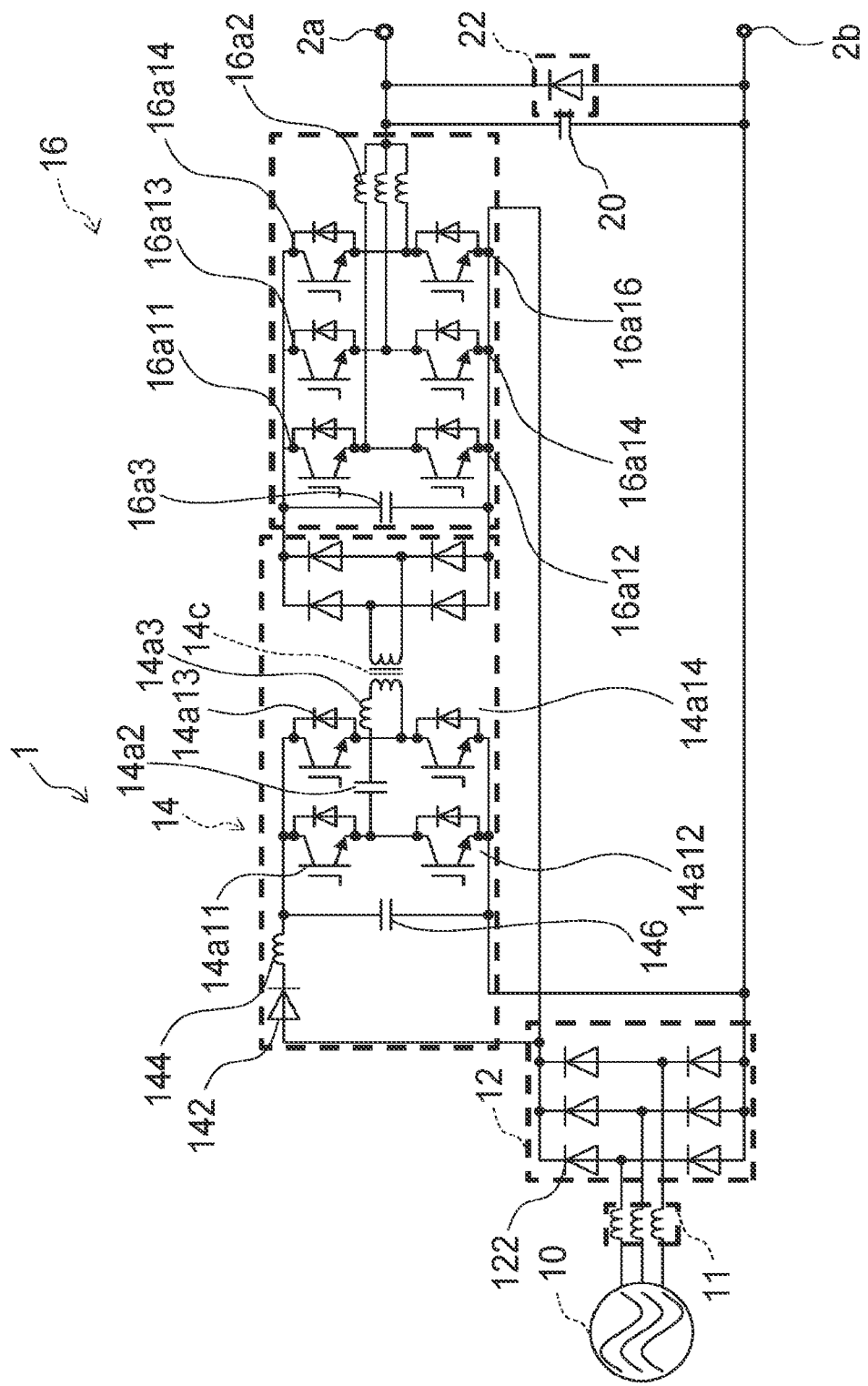
FIG. 8 is a diagram illustrating a configuration example of a DC transformation system according to a third modification of the first embodiment.

FIG. 8 is a diagram illustrating a configuration example of the DC transformation system 1 according to the third modification of the first embodiment. As illustrated in FIG. 8, the series compensation device 16 is formed of an interleaved power conversion device. That is, the two switching elements 16a11 and 16a12 connected in series are multi-parallelized and the reactor 16a2 is connected in parallel between each connection point between the upper and lower arms of the switching elements 16a11 and 16a12 and the terminal 2a. While including three parallelized sets, the DC transformation system 1 according to the third modification of the first embodiment is not limited thereto and it suffices to include two or more parallelized sets.

This enables the carrier phase to be shifted and specific harmonics can be reduced or the equivalent carrier frequency can be maintained while decreasing the switching loss per element. Further, with combination of the reactors at the output, the loss of the series compensation device 16 can be reduced and the series compensation device 16 can be downscaled more. Because the series compensation device 16 superimposes the output voltage on the voltage of the rectifier 12, the output voltage can be decreased as compared to general DC transformation systems while the voltage is inclined to be smaller and the current is inclined to be larger because the output current is maintained. Therefore, the effect of suppression in the surge voltage due to interleaving is relatively large unlike in general power conversion devices.

Fourth Modification of First Embodiment

The DC transformation system 1 according to a fourth modification of the first embodiment is different from the DC transformation system 1 according to the first embodiment in stopping the power conversion operation of the power conversion device 14 and the series compensation device 16 when a current opposite to that in the normal operation flows in the series compensation device 16. In the following descriptions, differences between the first embodiment and the fourth modification are explained.

Figure 9:
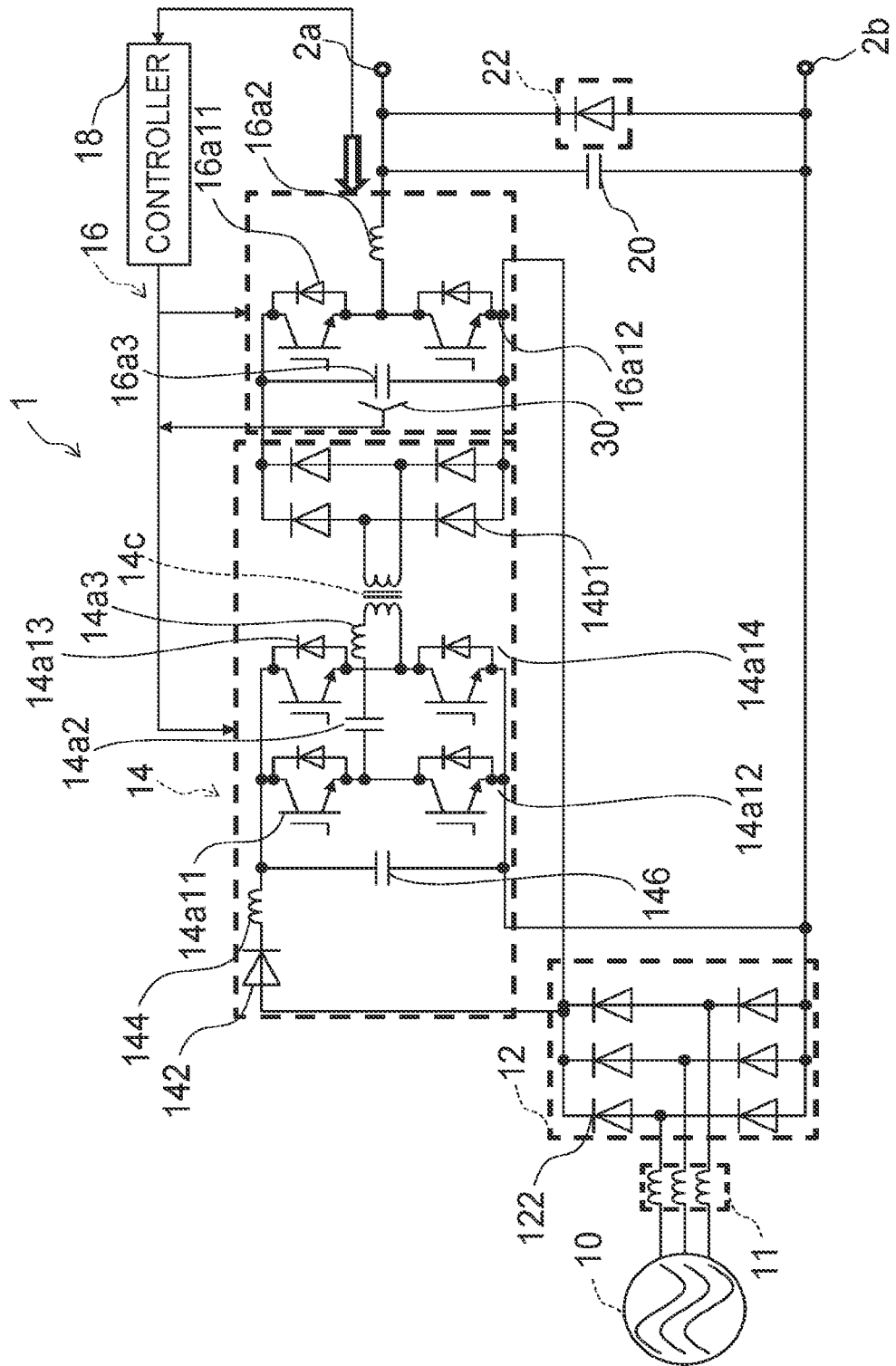
FIG. 9 is a diagram illustrating a configuration example of a DC transformation system according to a fourth modification of the first embodiment.

FIG. 9 is a diagram illustrating a configuration example of the DC transformation system 1 according to the fourth modification of the first embodiment. As illustrated in FIG. 9, the control device 18 stops the power conversion operation of the power conversion device 14 and the series compensation device 16 when a current opposite to that in the normal operation is assumed to flow on the basis of the output voltage V2 of the series compensation device 16. Accordingly, a situation in which a failure occurs in the series compensation device 16 due to excessive regenerative power to the DC transformation system 1 can be avoided.

Fifth Modification of First Embodiment

The DC transformation system 1 according to a fifth modification of the first embodiment is different from the DC transformation system 1 according to the first embodiment in that the diode 142 is omitted, that the AC/DC converter 14b of the power conversion device 14 is formed of four switching elements 15b1, and that the series compensation device 16 is formed of an inverter. In the following descriptions, differences between the first embodiment and the fifth modification are explained.

Figure 10:
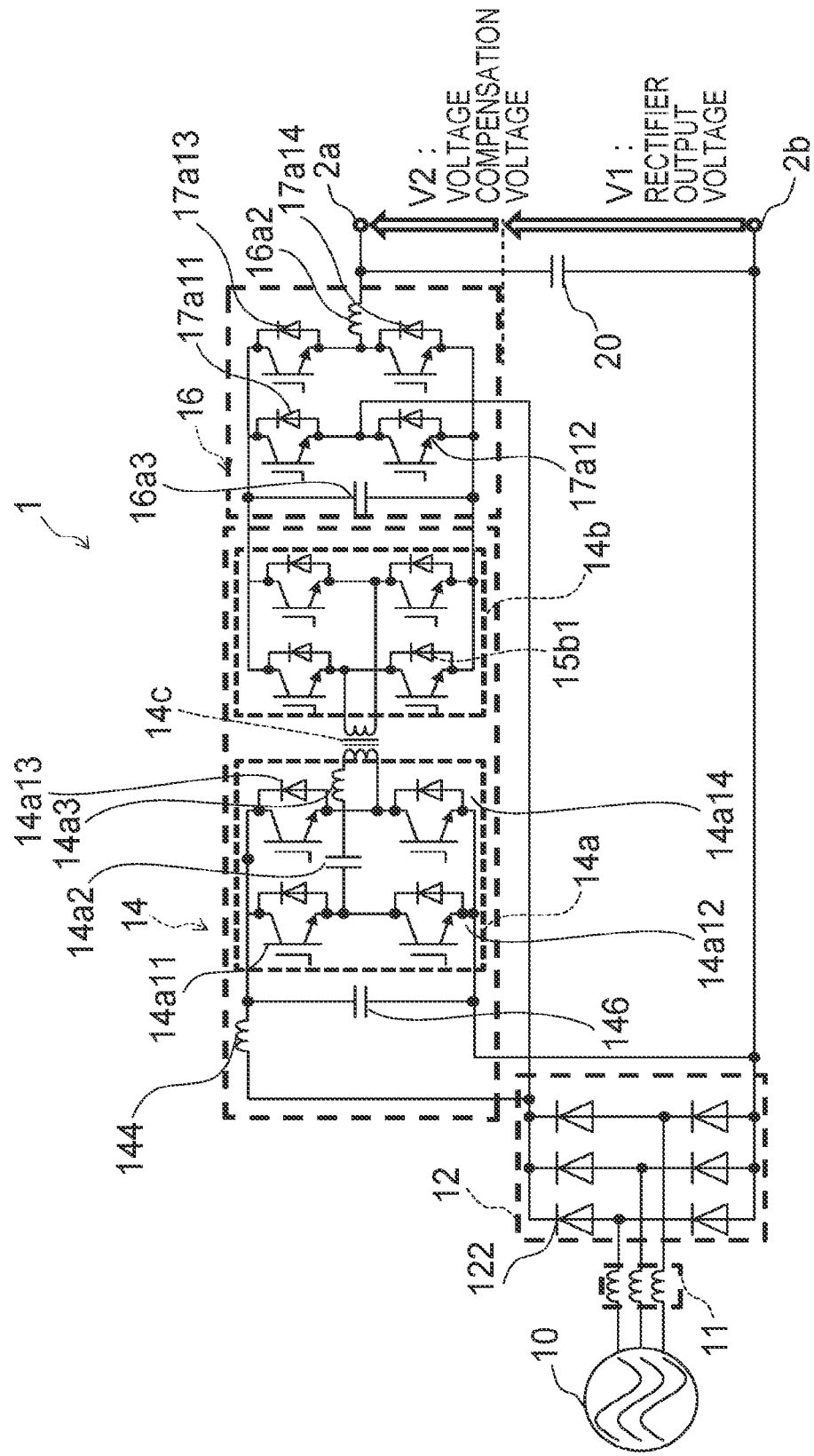
FIG. 10 is a diagram illustrating a configuration example of a DC transformation system according to a fifth modification of the first embodiment.

FIG. 10 is a diagram illustrating a configuration example of the DC transformation system 1 according to the fifth modification of the first embodiment. As illustrated in FIG. 10, the diode 142 is omitted and the AC/DC converter 14b is different from the AC/DC converter 14b according to the first embodiment in being formed of the four switching elements 15b1.

The four switching elements 15b1 constitute a full-bridge circuit. A high-frequency AC voltage from the secondary side of the isolation transformer 14c is converted into a DC voltage by the full-bridge circuit formed of four diodes. Due to configuration of the four switching elements 15b1 as the full-bridge circuit, power conversion can be performed bidirectionally.

The series compensation device 16 according to the fifth modification of the first embodiment is different from the series compensation device 16 according to the first embodiment in being configured as an inverter of a so-called four-quadrant chopper. The output end thereof is connected to the terminal 2a on the high-tension side of the DC transformation system 1 and the terminal on the high-tension side of the rectifier 12 via the reactor 16a2.

The series compensation device 16 includes four switching elements 17a11 to 17a14 and the reactor 16a2. That is, the four switching elements 17a11 to 17a14 are configured as a full-bridge circuit and can output voltages at both polarities. The series compensation device 16 receives the firing signal from the control device 18 (FIG. 1) and the firing timings of the switching elements 17a11 to 7a14 are controlled, whereby the voltage compensation voltage V2 is adjusted.

More specifically, the control device 18 outputs the voltage compensation instruction value V2s to the series compensation device 16 on the basis of the voltage instruction value Vs and the rectifier output voltage V1. That is, the control device 18 controls the series compensation device 16 to cause the addition/subtraction voltage of the rectifier output voltage V1 and the voltage compensation voltage V2 to be the predetermined voltage Vs. The control device 18 also controls the series compensation device 16 to cause the voltage compensation voltage V2 to be equal to or lower than the rectifier output voltage V1. Accordingly, power converted by the series compensation device 16 becomes equal to or lower than power converted by the rectifier 12.

As illustrated in FIG. 2, the control device 18 controls the series compensation device 16 in such a manner that the addition/subtraction voltage of the rectifier output voltage V1 and the voltage compensation voltage V2 becomes the voltage instruction value Vs. Accordingly, the potential between the positive terminal 2a and the negative terminal 2b can be stabilized more. In a case in which a diode rectifier is used as the rectifier 12, no high-frequency current flows and therefore an inexpensive general-purpose rectifier diode compliant with a 50 Hz/60 Hz power source can be used. Because the series compensation device 16 outputs only a stepped-up/down voltage portion, the capacity of the semiconductor switching element and the like can be decreased more.

Also in the DC transformation system 1 (FIG. 8) according to the third modification of the first embodiment, the diode 142 may be omitted, the AC/DC converter 14b of the power conversion device 14 may be formed of the four switching elements 15b1, and the series compensation device 16 may be formed of an inverter including the four switching elements 17a11 to 17a14 and the reactor 16a2, similarly in the present modification. Also in this case, the control device 18 can control the series compensation device 16 to cause the addition/subtraction voltage of the rectifier output voltage V1 and the voltage compensation voltage V2 to be the predetermined voltage Vs.

As described above, according to the present modification, the series compensation device 16 can be controlled to cause the addition/subtraction voltage of the rectifier output voltage V1 and the voltage compensation voltage V2 to be the predetermined voltage Vs. In this way, because the series compensation device 16 outputs only a stepped-up/down voltage portion of the DC voltage V2, the capacities of the power conversion device 14 and the series compensation device 16 can be decreased more.

Second Embodiment

The DC transformation system 1 according to the second modification of the first embodiment is different in that an electric storage device 62 is provided instead of the rectifier 12 and that the electric storage device 62 and a series compensation device 66 are connected in series. In the following descriptions, differences between the first embodiment and a second embodiment are explained.

Figure 11:
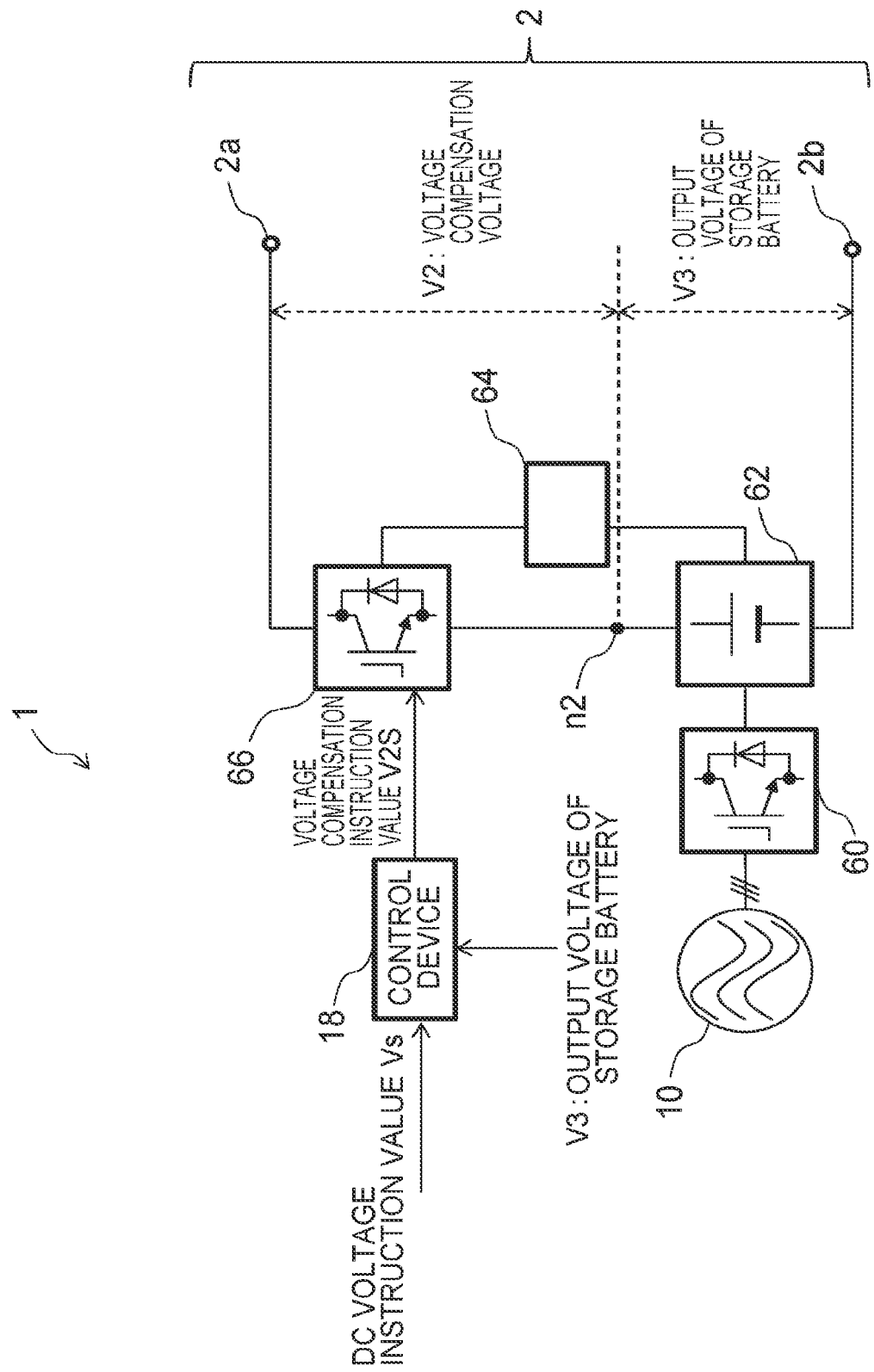
FIG. 11 is a diagram illustrating a configuration example of a DC transformation system according to a second embodiment.

FIG. 11 is a diagram illustrating a configuration example of the DC transformation system 1 according to the second embodiment. As illustrated in FIG. 11, the DC transformation system 1 according to the present embodiment is, for example, a system capable of feeding DC power to a train or the like and is configured to include a charging/discharging device 60, the electric storage device 62, a power conversion device 64, the series compensation device 66, and the control device 18. FIG. 11 further illustrates the positive terminal 2a and the negative terminal 2b. For example, the positive terminal 2a and the negative terminal 2b constitute the DC electric line 2. For example, overhead wires are electric lines at a potential on the positive terminal side and rails are electric lines at a potential on the negative terminal side.

The charging/discharging device 60 is connected to the AC power source 10 and supplies DC power to the electric storage device 62. This charging/discharging device 60 can perform, for example, bidirectional power conversion and converts between an alternate current and a direct current. Accordingly, this charging/discharging device 60 can provide regenerative power supplied from the DC electric line 2 toward the power source 10. While the charging/discharging device 60 according to the present embodiment can perform bidirectional power conversion, the charging/discharging device 60 is not limited thereto and may be a unidirectional charging device. In the case of a unidirectional charging device, the amount of regenerative power is sometimes limited.

The electric storage device 62 is, for example, a storage battery and stores power supplied from the charging/discharging device 60. The electric storage device 62 outputs DC output power V3. The electric storage device 62 is not limited to a storage battery and may be an energy storage device being a combination of a flywheel battery or a fuel cell and a hydrogen generation device, or the like.

The power conversion device 64 supplies power to the series compensation device 66. The power conversion device 64 receives, for example, supply of power from at least one of the charging/discharging device 60 and the electric storage device 62. The power conversion device 64 can provide regenerative power supplied from the DC electric line 2 toward the power source 10. The power conversion device 64 is a high-voltage power conversion device or an insulated power conversion device.

The series compensation device 66 is, for example, a DC/DC converter and is connected between a node n2 on the positive terminal side of the electric storage device 62 and the positive terminal 2a. The series compensation device 66 outputs the voltage compensation voltage V2 using power supplied from the power conversion device 64. The series compensation device 66 can provide regenerative power supplied from the DC electric line 2 toward the power source 10.

The control device 18 is configured, for example, to include a CPU (Central Processing Unit) and outputs the voltage compensation instruction value V2s to the series compensation device 66 on the basis of the voltage instruction value Vs and the output voltage V3 of the electric storage device 62.

In this way, the output voltage of the DC transformation system 1 can be adjusted with addition or subtraction of the voltage of the series compensation device 66 connected in series to the electric storage device 62. The DC transformation system 1 according to the present embodiment can provide regenerative power supplied from the DC electric line 2 toward the power source 10.

The DC transformation system 1 according to the present embodiment can add the voltage of the series compensation device 66 connected in series to the electric storage device 62. Therefore, the capacity corresponding to the peak power of the output is not required. Therefore, the charging/discharging device 60, the power conversion device 64, and the series compensation device 66 can be sufficiently reduced in the output capacity relative to that of the conventional DC transformation system 1. The electric storage device 62 can stably output power and the contracted power can be decreased to the same extent as average power. This eliminates the need to adapt the contract with the electric power company to the peak power of the output and the contracted power can be decreased to the same extent as average power. Accordingly, the system or the electric generator capacity can be minimized.

Figure 12:
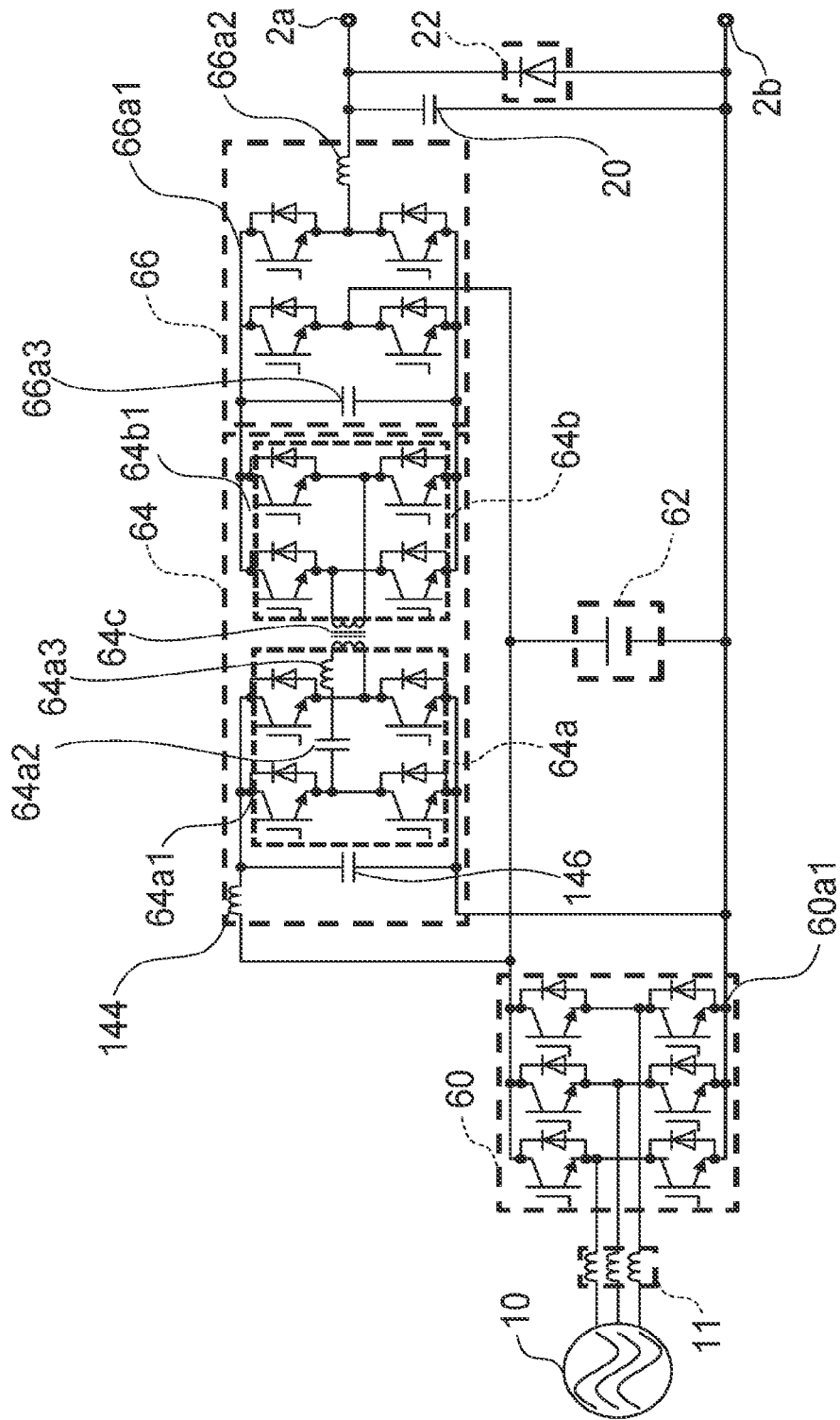
FIG. 12 is a diagram illustrating a detailed configuration example of the DC transformation system according to the second embodiment.

FIG. 12 is a diagram illustrating a detailed configuration example of the DC transformation system 1 according to the second embodiment. FIG. 12 illustrates the AC reactor 11, the charging/discharging device 60, the electric storage device 62, the power conversion device 64, the series compensation device 66, the capacitor 20, and the short-circuit free-wheeling diode 22.

The AC reactor 11 indicates an interconnected reactor, a system inductance, and a leakage inductance of a transformer or an electric generator. The charging/discharging device 60 is configured to include a plurality of switching elements 60a1 connected in a full-bridge manner to perform bidirectional power conversion.

The charging/discharging device 60 is formed of six switching elements 60a1. While the charging/discharging device 60 can perform bidirectional power conversion, it may be a unidirectional charging device. In this case, however, the amount of regenerative power is sometimes limited.

The power conversion device 64 is a full-bridge resonant converter and includes the reactor 144, the capacitor 146, a DC/AC converter 64a, an AC/DC converter 64b, and an isolation transformer 64c. The reactor 144 and the capacitor 146 constitute an LC filter and reduce, for example, noise components synchronous with a switching frequency.

The DC/AC converter 64a is a DC/AC converter called "full bridge". The DC/AC converter 64a includes four switching elements 64a1, a resonant capacitor 64a2, and a resonant reactor 64a3. The 4 switching elements 64a1 constitute a full-bridge circuit. The resonant capacitor 64a2 and the resonant reactor 64a3 are inserted between both ends of the primary side of the isolation transformer 64c and an output of the full-bridge circuit formed of the four switching elements 64a1. The operating characteristics are identical to those of the DC/AC converter 14a explained with reference to FIG. 3 and thus explanations thereof are omitted. The DC/AC converter 64a is not limited to the full-bridge type and may be a half-bridge type.

The AC/DC converter 64b includes four switching elements 64b1. These four switching elements 64b1 constitute a full-bridge circuit. A high-frequency AC voltage from the secondary side of the isolation transformer 64c is converted into a DC voltage by the full-bridge circuit formed of four diodes. Power conversion can be performed bidirectionally by configuring the four die-switching elements 64b1 into a full-bridge circuit.

The series compensation device 66 is configured as a so-called four-quadrant chopper and an output thereof is connected to an output terminal 2a of the DC transformation system 1 and the positive terminal side of the electric storage device 62 via a reactor 66a2. The series compensation device 66 includes four switching elements 66a1, the reactor 66a2, and a capacitor 66a3. That is, the four switching elements 66a1 are configured as a full-bridge circuit and can output voltages of both polarities. The series compensation device 66 receives the firing signal from the control device 18 (FIG. 11) and the firing timings of the switching elements 66a1 are controlled, whereby the voltage compensation voltage V2 is adjusted.

As described above, according to the present embodiment, because the voltage of the series compensation device 66 connected in series to the electric storage device 62 can be added, the capacities of the series compensation device 66 and the power conversion device 64 can be reduced more. Further, the power stored in the electric storage device 62 can also be used and the capacity corresponding to the peak power of the output of the DC transformation system 1 is not required.

First Modification of Second Embodiment

The DC transformation system 1 according to a first modification of the second embodiment is different from the DC transformation system 1 according to the second embodiment in that the capacitor 20 is connected in parallel to the series compensation device 66. In the following descriptions, differences between the first modification and the second embodiment are explained.

Figure 13:
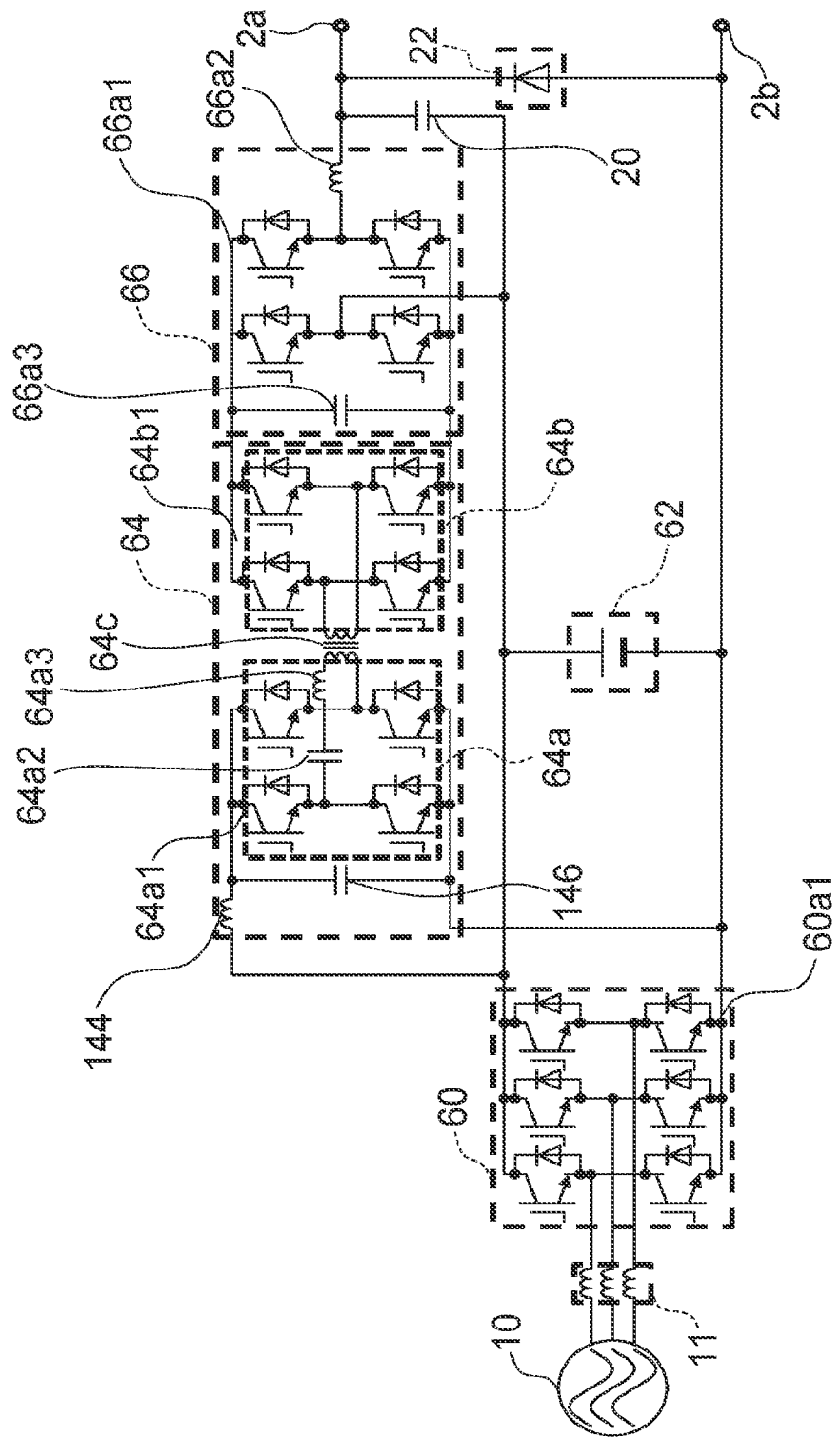
FIG. 13 is a diagram illustrating a configuration example of a DC transformation system according to a first modification of the second embodiment.

FIG. 13 is a diagram illustrating a configuration example of the DC transformation system 1 according to the first modification of the second embodiment. As illustrated in FIG. 13, the capacitor 20 is connected in parallel to the series compensation device 16. This enables the output of the series compensation device 66 to be smoothed.

Second Modification of Second Embodiment

The DC transformation system 1 according to a second modification of the second embodiment is different from the DC transformation system 1 according to the second embodiment in that a power source 70 is a DC power source of photovoltaic generation (PV generation), fuel cell generation (FC generation), or the like. In the following descriptions, differences between the DC transformation system 1 according to the second modification and the DC transformation system 1 according to the second embodiment are explained.

Figure 14:
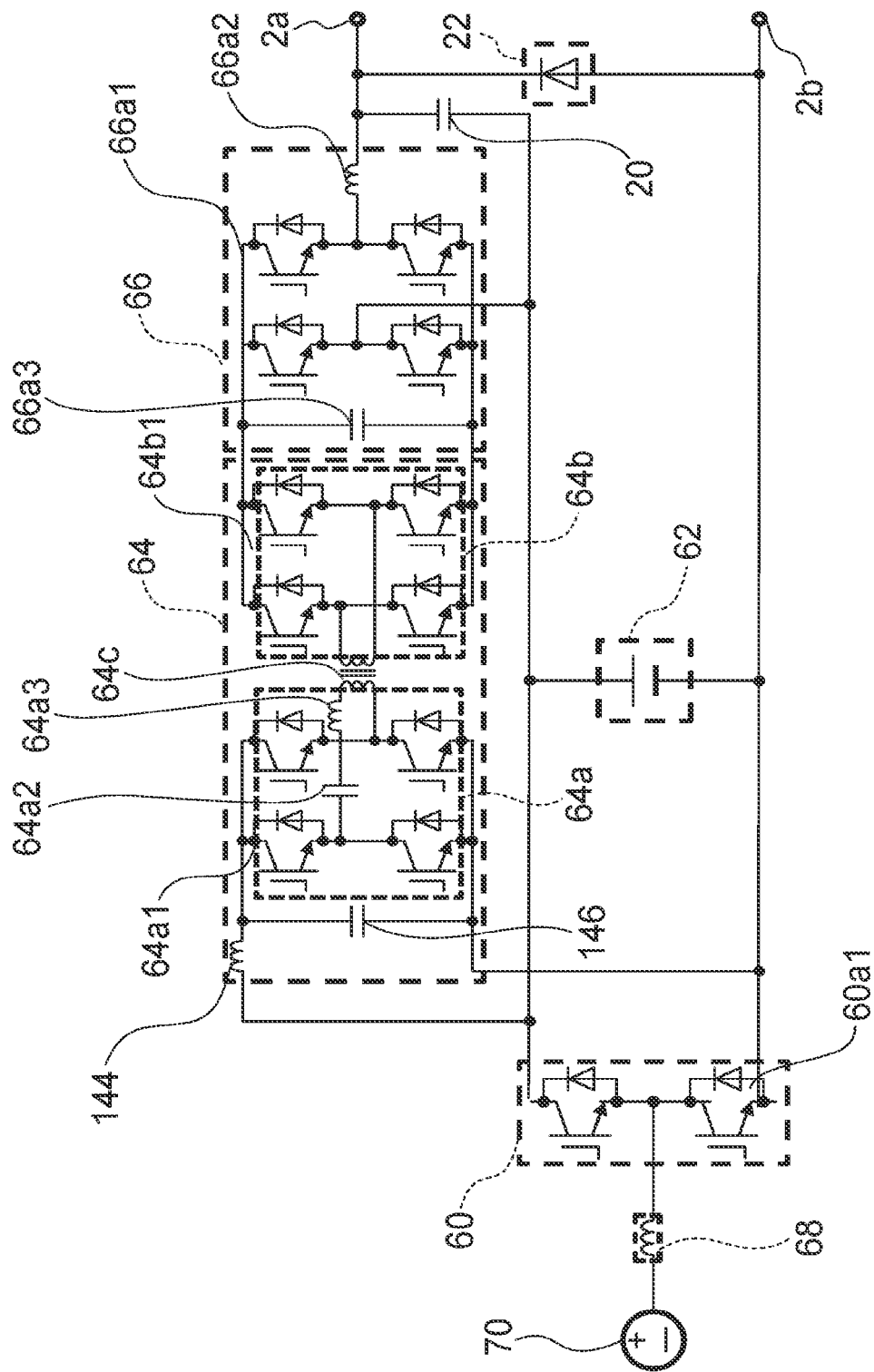
FIG. 14 is a diagram illustrating a configuration example of a DC transformation system according to a second modification of the second embodiment.
Figure 15:
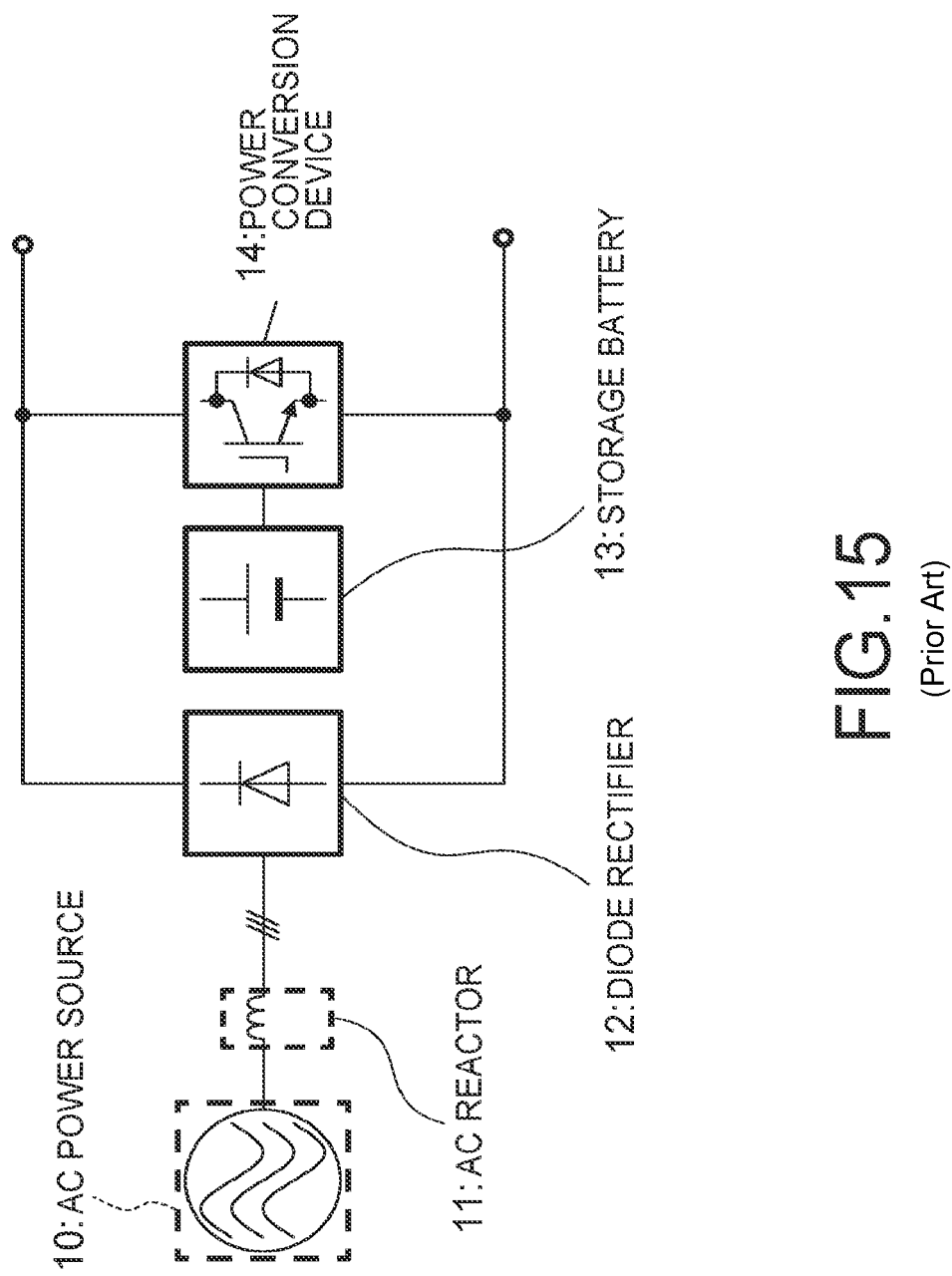
FIG. 15 is a diagram illustrating a configuration example of a conventional DC transformation system.
Figure 16:
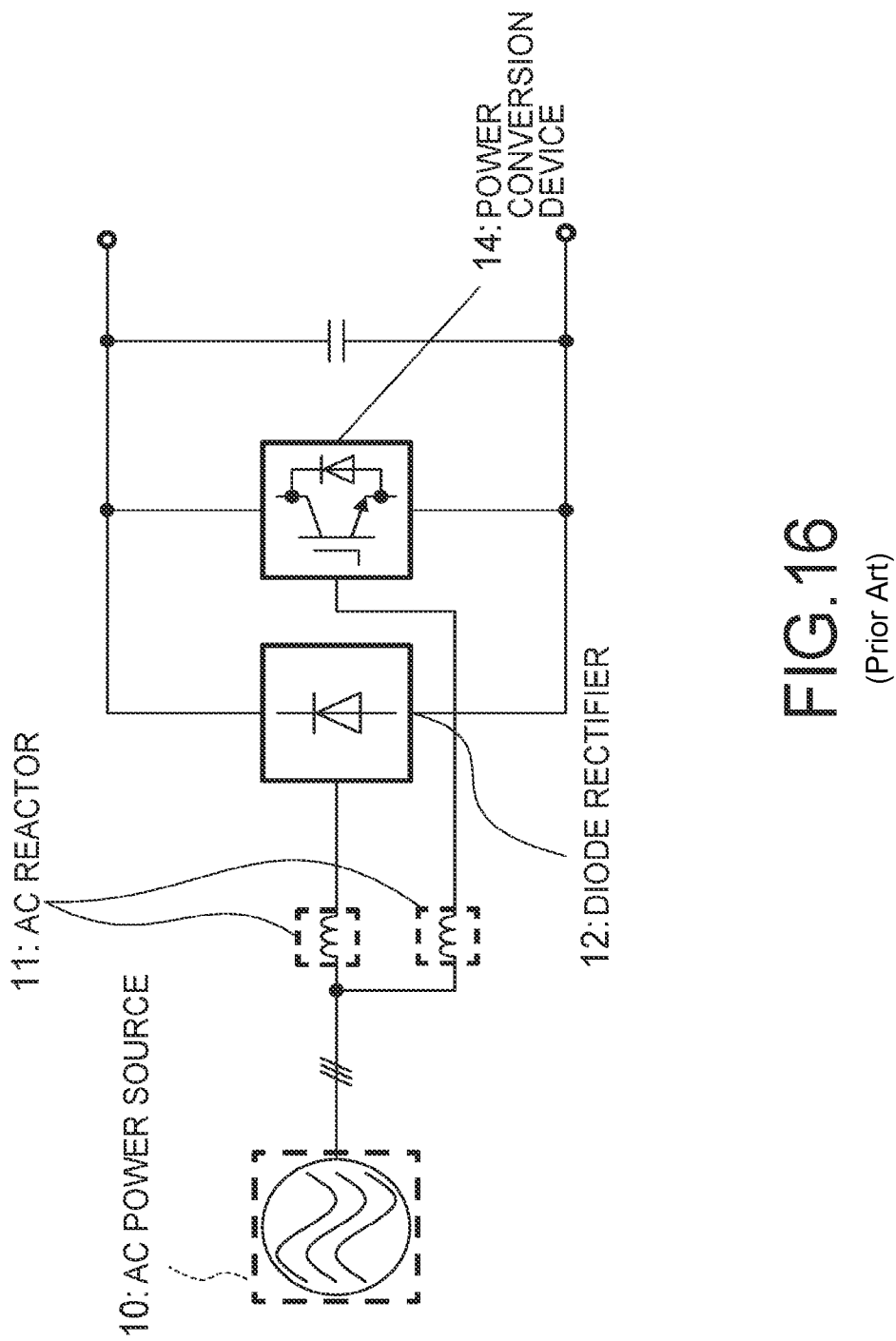
FIG. 16 is a diagram illustrating a configuration example of the conventional DC transformation system by an AC power source.
Figure 17:
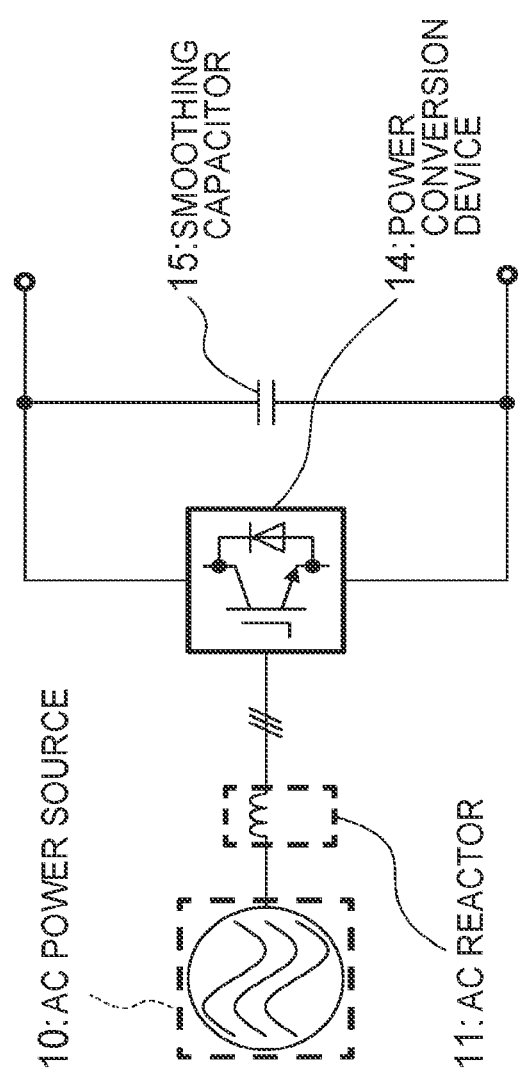
FIG. 17 is a diagram illustrating a configuration example of the conventional DC transformation system in which a smoothing capacitor is connected in parallel.

FIG. 14 is a diagram illustrating a configuration example of the DC transformation system 1 according to the second modification of the second embodiment. As illustrated in FIG. 14, the charging/discharging device 60 is formed of two switching elements 60a1. A connection point of the two switching elements 60a1 is connected to the power source 70 via a DC reactor 68.

The power source 70 is constituted by a DC power source of photovoltaic generation (PV generation), fuel cell generation (FC generation), or the like. However, the photovoltaic generation (PV generation) or the fuel cell generation (FC generation) cannot perform power regeneration and thus the amount of regenerative power is limited.

As described above, with provision of the charging/discharging device 60 that converts power supplied from a power generation device of the photovoltaic generation (PV generation) or the like that generates power using natural energy, the DC transformation system 1 according to the second modification of the second embodiment can supply DC power without supply of power from a power system.

While certain embodiments have been described, these embodiments have been presented by way of example only, and are not intended to limit the scope of the inventions. Indeed, the novel embodiments described herein may be embodied in a variety of other forms and various omissions, substitutions, and changes may be made without departing from the spirit of the inventions. The embodiments and their modifications are intended to be included in the scope and the spirit of the invention and also in the scope of the invention and their equivalents described in the claims.

The invention claimed is:

1. A DC transformation system comprising:
   a rectifier configured to rectify AC power supplied from an AC power source and output a first DC voltage;
   a first power conversion device connected in series to the rectifier and configured to output a second DC voltage;
   a second power conversion device connected in parallel to the rectifier and configured to convert power supplied from the rectifier to supply the converted power to the first power conversion device;
   a control device configured to control the first power conversion device to cause an addition or subtraction of voltage of the first DC voltage and the second DC voltage to be a predetermined voltage, wherein the second DC voltage is equal to or lower than the first DC voltage; and
   a diode connected in antiparallel between a terminal on a high-tension side of the first power conversion device and a terminal on a low-tension side of the rectifier,
   wherein the first power conversion device comprises:
      first and second switching elements connected in series between terminals of the second power conversion device;
      a reactor connected between a neutral point of the first and second switching elements and an output terminal on a high-tension side; and
      a capacitor connected in parallel to the first and second switching elements,
      each of the first and second switching elements comprises a semiconductor switching element and an antiparallel diode, and
      the control device executes PWM control on the first and second switching elements; and
   wherein the second power conversion device comprises:
      first and second switching elements connected in series between DC terminals on an input side of the second power conversion device;
      third and fourth switching elements connected in parallel to the first and second switching elements;
      a primary coil, a resonant reactor, and a resonant capacitor connected between a neutral point of the third and fourth switching elements and a neutral point of the first and second switching elements of the second power conversion device;
      a secondary coil configured to constitute an isolation transformer along with the primary coil; and
      an AC/DC converter connected to the secondary coil and having the first power conversion device connected between DC terminals on an output side of the second power conversion device, and
      each of the first to fourth switching elements of the second power conversion device comprises a semiconductor switching element and an antiparallel diode, and soft-switching is performed due to resonance of the resonant reactor and the resonant capacitor.

2. The system of claim 1, wherein the rectifier is a diode rectifier.

3. The system of claim 1, wherein
   the first power conversion device is configured to include a plurality of sets of two switching elements connected in series, the plurality of sets being connected in parallel between output terminals of the second power conversion device, and
   the control device executes interleaved control in which each set of the switching elements is turned on at a predetermined timing to decrease predetermined harmonics.

4. The system of claim 1, wherein the control device stops operations of the first power conversion device and the second power conversion device when an opposite current flows in the first power conversion device.

5. A DC transformation system comprising:
   a charging/discharging device connected to an AC power source and configured for bidirectional power conversion;
   a storage battery connected in parallel to the charging/discharging device and configured to output a first DC voltage;
   a regenerative first power conversion device connected in series to the storage battery and configured to output a second DC voltage;
   a regenerative second power conversion device connected in parallel to the charging/discharging device and configured to convert power supplied from the charging/discharging device to supply the converted power to the first power conversion device;
   a control device configured to control the first power conversion device to cause an addition voltage of the first DC voltage and the second DC voltage to be a predetermined voltage, wherein the second DC voltage is equal to or lower than the first DC voltage; and
   a diode connected in antiparallel between a terminal on a high-tension side of the first power conversion device and a terminal on a low-tension side of the charging/discharging device,
   wherein the first power conversion device comprises:
      first and second switching elements connected in series between terminals of the second power conversion device;
      a reactor connected between a neutral point of the first and second switching elements and an output terminal on a high-tension side; and
      a capacitor connected in parallel to the first and second switching elements, each of the first and second switching elements comprises a semiconductor switching element and an antiparallel diode, and the control device executes PWM control on the first and second switching elements; and wherein the second power conversion device comprises:

first and second switching elements connected in series between DC terminals on an input side of the second power conversion device;

third and fourth switching elements connected in parallel to the first and second switching elements;

a primary coil, a resonant reactor, and a resonant capacitor connected between a neutral point of the third and fourth switching elements and a neutral point of the first and second switching elements of the second power conversion device;

a secondary coil configured to constitute an isolation transformer along with the primary coil; and an AC/DC converter connected to the secondary coil and having the first power conversion device connected between DC terminals on an output side of the second power conversion device, and each of the first to fourth switching elements of the second power conversion device comprises a semiconductor switching element and an antiparallel diode, and soft-switching is performed due to resonance of the resonant reactor and the resonant capacitor.

6. A DC transformation system comprising:

a charging/discharging device connected to a DC power source and configured for bidirectional power conversion;

a storage battery connected in parallel to the charging/discharging device and configured to output a first DC voltage;

a regenerative first power conversion device connected in series to the storage battery and configured to output a second DC voltage;

a regenerative second power conversion device connected in parallel to a third power conversion device and configured to convert power supplied from the third power conversion device to supply the converted power to the first power conversion device;

a control device configured to control the first power conversion device to cause an addition voltage of the first DC voltage and the second DC voltage to be a predetermined voltage, wherein the second DC voltage is equal to or lower than the first DC voltage; and a diode connected in antiparallel between a terminal on a high-tension side of the first power conversion device and a terminal on a low-tension side of the charging/discharging device, wherein the first power conversion device comprises:

first and second switching elements connected in series between terminals of the second power conversion device;

a reactor connected between a neutral point of the first and second switching elements and an output terminal on a high-tension side; and a capacitor connected in parallel to the first and second switching elements, each of the first and second switching elements comprises a semiconductor switching element and an antiparallel diode, and the control device executes PWM control on the first and second switching elements;

wherein the third power conversion device comprises:

first and second switching elements connected in series between DC terminals on an input side of the third power conversion device;

third and fourth switching elements connected in parallel to the first and second switching elements; and a primary coil, a resonant reactor, and a resonant capacitor connected between a neutral point of the third and fourth switching elements and a neutral point of the first and second switching elements of the third power conversion device; and wherein the second power conversion device comprises:

a secondary coil configured to constitute an isolation transformer along with the primary coil;

the first power conversion device connected between DC terminals on an output side of the second power conversion device, and each of the first to fourth switching elements of the third power conversion device comprises a semiconductor switching element and an antiparallel diode, and soft-switching is performed due to resonance of the resonant reactor and the resonant capacitor.

* * * * *